United States Patent [19]

Chan

[11] Patent Number: 4,500,933
[45] Date of Patent: Feb. 19, 1985

[54] UNIVERSAL INTERFACE UNIT

[75] Inventor: Steven S. Chan, Fremont, Calif.

[73] Assignee: Ampex Corporation, Redwood City, Calif.

[21] Appl. No.: 364,922

[22] Filed: Apr. 2, 1982

[51] Int. Cl.³ .................. H03K 13/24; G11B 31/00
[52] U.S. Cl. .................................. 360/69; 364/200; 364/900
[58] Field of Search ............ 360/69; 364/200, 900

[56] References Cited
U.S. PATENT DOCUMENTS
4,207,687 6/1980 Haas et al. .................. 35/12 R Primary Examiner—George G. Stellar
Attorney, Agent, or Firm—James A. LaBarre; Joel D. Talcott

[57] ABSTRACT

A universal interface unit for providing output signals in any one of a plurality of different signal formats stores information relating to each of the different available formats. When signals are to be provided to a particular device, personality data regarding the device enables the particular signal format requirements of the device to be read from the stored information. A signal processor responsive to this information generates output signals in that format. The output signals are transmitted to the device through a switching circuit that is appropriately connected to the device to provide the proper polarity.

13 Claims, 4 Drawing Figures

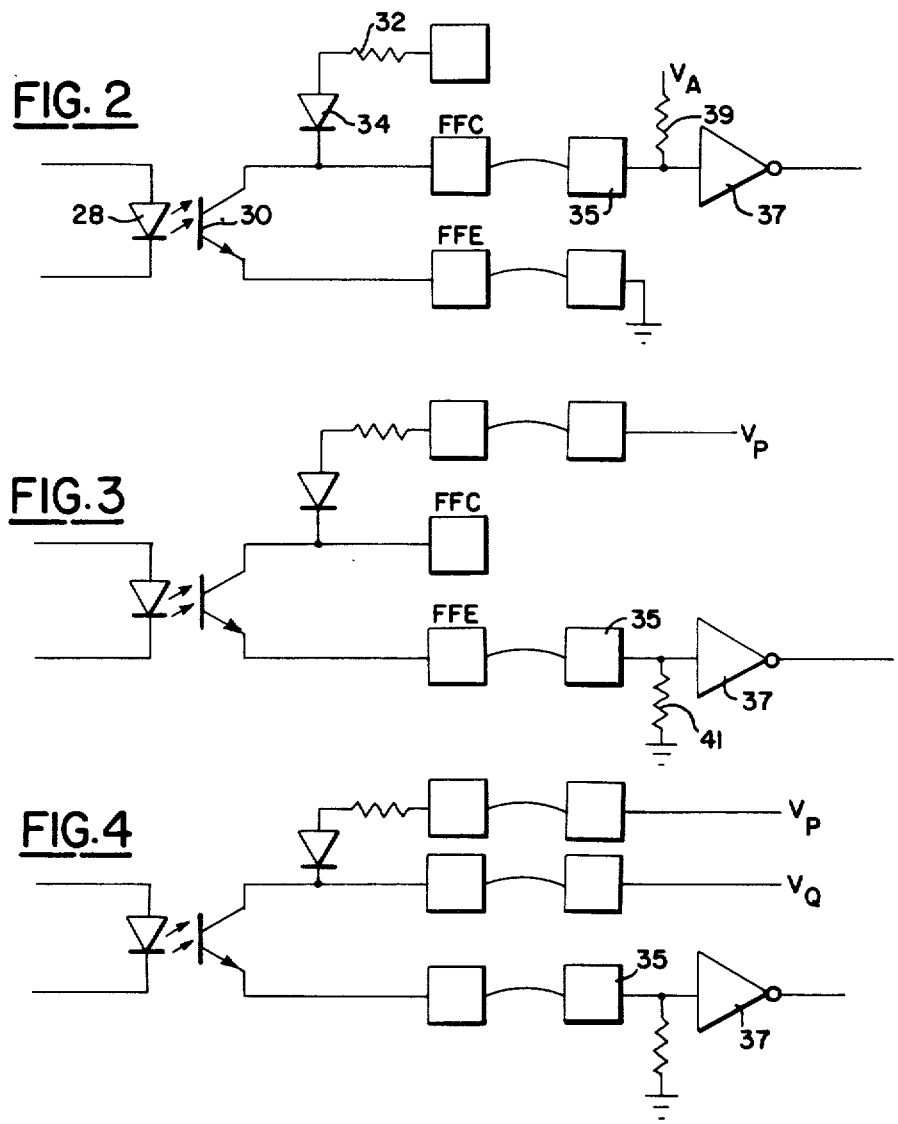

UNIVERSAL INTERFACE UNIT

BACKGROUND OF THE INVENTION

The present invention relates to an interface unit for transmitting control signals from a controller to an apparatus to be controlled. In particular, the invention relates to a universal interface unit for connecting a synchronizer to any one of a plurality of different types of recorders.

In the recording of information on magnetic storage tapes, it is often necessary to record separate pieces of the information on different tapes with the use of different recorders. For example, video information might be recorded on one tape while accompanying audio information is recorded on a second tape. During playback of these tapes, it is necessary to insure that they are in synchronism so that the information is presented in the same fashion as it was recorded. Thus, if the video recorder is rewound to replay a particular segment of the information, the audio recorder must also be rewound so that the appropriate accompanying sound is also replayed.

The synchronism of the tapes is carried out with the use of a time code that is simultaneously recorded onto all of the tapes along with the information of interest. During playback, the time codes on the tapes are monitored and the operation of the recorders are controlled so that the time codes are in synchronism. In the preceding example, the time code from the video tape recorder is monitored as a master time code, and the speed and direction of the audio tape recorder are controlled by a synchronizer unit so that the time code on the audio tape is the same as the master code.

A practical problem encountered in the control of one or more recorders by a synchronizer unit is occassioned by the different types of control signals required by different recorders. For example, a recorder produced by one manufacturer may require a particular D.C. level to be maintained to operate the recorder in a fast forward mode, whereas a different manufacturer's recorder may require a pulse to begin the fast forward operation and a subsequent pulse to halt it.

In the past, the need for different types of control signals for different recorders was met by the use of a dedicated interface that was custom designed for a particular recorder and the synchronizer. Each different recorder required its own interface to provide the appropriate control signals. An interface is a relatively expensive piece of equipment and, in an environment where a number of recorders are to be operated in synchronism, the costs for required interface units alone can be substantial.

This problem is not unique to recorders. It is a real concern in a variety of situations in which control or information signals generated in one piece of equipment must be appropriately modified or conditioned in an interface unit before they can be applied to another peice of equipment.

OBJECTS AND BRIEF SUMMARY OF THE INVENTION

It is therefore a general object of the present invention to provide a novel interface unit that is universal in application and avoids the need for an individual custom-designed interface for each type of utility apparatus.

It is a more specific object of the present invention to provide a novel interface unit for providing the control signals from a synchronizer to different types of magnetic tape recorders.

It is a further object of the present invention to provide a novel interface unit that is capable of recognizing one of a number of different types of external devices and that can produce appropriate control signals that are compatible with a recognized device.

In accordance with the present invention, these objects are achieved by storing information relating to each of the different signal formats that may be required by various external devices, such as tape recorders. When signals are to be provided to a particular device, personality data regarding that device enables the particular signal format requirements of the device to be read from the stored information. A signal processor is responsive to this information and generates output signals in the format that is identified. These output signals are transmitted to the external device through a switching circuit that is appropriately connected to the external choice so as to provide sinking or sourcing of current, as required.

The manner in which the present invention achieves the foregoing objects can best be understood upon a perusal of the following detailed description of a preferred embodiment of the invention illustrated in the accompanying drawings.

BRIEF DESCRIPTION OF THE DRAWINGS

FIG. 2 is a schematic circuit diagram of one manner in which the output terminals of the interface unit can be connected to an external device to provide a current sinking arrangement;

FIG. 3 is a schematic circuit diagram of one manner in which the output terminals of the interface unit can be connected to an external device to provide a current sourcing arrangement; and FIG. 4 is a schematic circuit diagram of alternative arrangement for connecting the output terminals of the interface unit to an external device to provide a current source configuration.

DETAILED DESCRIPTION

Figure 1:
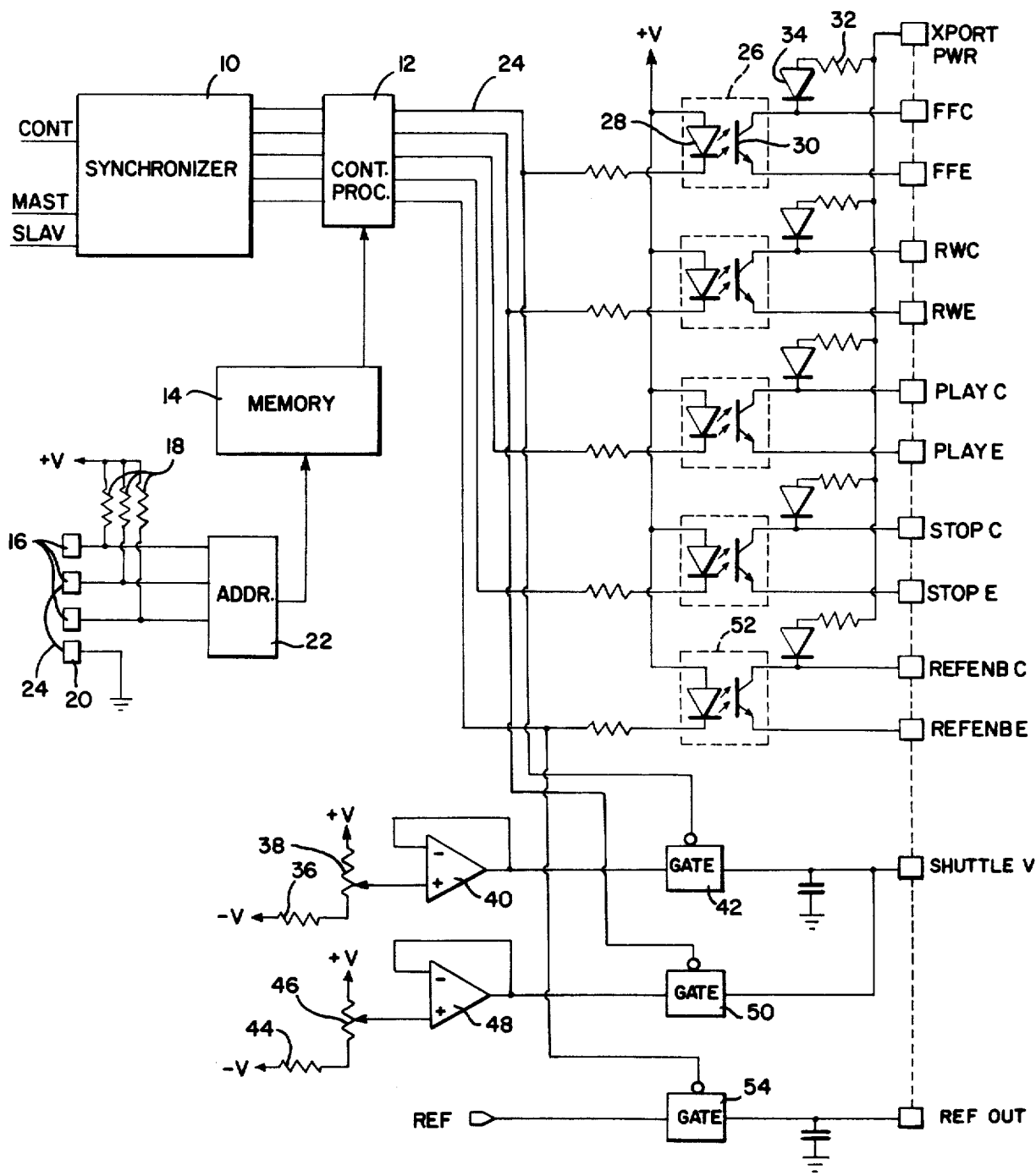
FIG. 1 is a circuit diagram, partly in block and partly in schematic form, of a universal interface unit constructed in accordance with the present invention.

In the following detailed description of the illustrated embodiment of the invention, reference is made thereto in the context of providing transport control signals to a tape recorder, to facilitate an understanding of the invention and its applications. It will be appreciated by those of ordinary skill in the art that the practical applications of the invention are not so limited, however, and that it can be successfully utilized in a number of environments in which it is desirable to provide different types of output signals from a common device to different types of external devices.

Referring to the circuit diagram of FIG. 1, a synchronizer control circuit 10 receives the time codes MAST and SLAV from master and slave tape recorders, as well as user supplied control signals CONT. The control circuit 10 can be any suitable conventional circuit for receiving these input signals and generating appropriate output signals for controlling a recorder (not shown). These output signals can instruct the recorder to operate in various modes, such as fast-forward, rewind, play, etc. and can establish various levels for tape speed and the like.

The output signals from the control circuit 10 are provided to a signal processor 12 that responds to them to apply appropriate control signals to the recorder. The format of the control signals that are generated by the processor 12 are determined according to the requirements of the recorder. For example, some recorders require a switching from a high to a low D.C. level, i.e. a pull-down, in the control signal to execute an operation. Others may require an opposite type of switching, a pull-up, or some form of a pulsed signal. The particular requirements of the recorder are supplied to the processor 12 by a memory unit 14 to enable it to generate the appropriate control signals.

When a recorder is connected to the synchronizer, input information relating to the recorder is provided as an address signal to the memory unit 14. Typically, a recorder is connected to a synchronizer by means of multi-pin connectors. Some of the pins of such a connector can be used to provide the input information regarding the personality of the particular recorder. In the embodiment of FIG. 1, three of the pins 16 on the synchronizer connector are connected to a positive potential V through appropriate bias resistors 18. Another pin 20 is directly connected to ground. By selectively connecting the pins 16 to the ground pin 20, a binary input signal relating to the control signal requirements of the recorder is provided to an address unit 22 connected to the pins 16. In the example illustrated in FIG. 1, a jumper 24 connected between the ground pin 20 and the middle pin 16 provides the binary signal 101 to the address unit 22. This binary signal identifies a particular recorder, or a group of recorders having the same input signal requirements. In response to this binary signal, the address unit 22 provides a suitable address signal to the memory unit 14. In turn, the memory unit 14 provides information to the processor 12 relating to the particular types of control signals that are to be applied to the recorder.

It will be appreciated that the identification of the recorder can be supplied to the memory unit in a different fashion. For example, a multi-position switch or a series of two-position switches can be utilized in place of the connector pins and jumpers. Furthermore, if the binary signal generated through the pins or switches is in a suitable form, it can be directly applied to the memory unit 14, rather than through the address unit 22.

The information stored within the memory unit 14 basically comprises a look-up table that indicates the various types of control signals required by different recorders, or groups of recorders. In response to information from the memory unit 14 identifying one particular format, and a signal from the control circuit 10, the signal processor 12 generates a control signal of a type determined by the designated format. For example, a particular recorder may require a pull-up signal to place it in a fast-forward mode. When the control circuit 10 indicates that the fast-forward mode of operation is required, the processor 12 generates a constant level signal on an output line 24 in response to this indication and the information from the memory unit 14. This signal is at a ground or negative potential and is applied to an input terminal of an optical isolator 26. It actuates a light-emitting diode 28 within the isolator 26, which in turn renders a phototransistor 30 conductive for the duration of the signal.

The collector and emitter terminals of the phototransistor 30 are respectively connected to two pins FFC and FFE on the connector for the synchronizer. In addition, the collector terminal is connected to a pin that is biased to the potential Vp of the transport power for the recorder. This latter connection is made via a series resistor 32 and a protection diode 34.

Various arrangements by which the pins on the synchronizer connector can be connected to the control signal terminals of the recorder, in accordance with its signal requirements, are illustrated in FIGS. 2-4. Some types of recorders require selective current sinking to provide the control signal. For example, the input terminal 35 of the recorder might be the input to an inverter 37 that is normally biased to a suitable voltage level $V_A$ through a resistor 39, as illustrated in FIG. 2. This input terminal is connected to the collector terminal FFC of the transistor 30 by the synchronizer connector. The emitter terminal FFE of the transistor is connected to ground. This connection can be made within the synchronizer itself, or it can be carried out through the connector and a grounded pin on the recorder, as schematically illustrated in FIG. 2.

When a low input signal to the recorder is required, the transistor 30 is rendered conductive by an output signal from the signal processor 12 to sink the current from the resistor 39. Alternatively when a high signal is required, the transistor 30 is turned off.

Another type of recorder may require a current source to provide the input signal. For example the input terminal 35 of the recorder can be connected to an inverter 37 that is normally grounded through a resistor 41, as illustrated in FIG. 3. To activate the inverter, the input level must be raised above ground. This function is achieved by connecting the recorder input terminal 35 to the emitter terminal FFE of the transistor 30. When the transistor is turned on, it sources current from the transport power pin to the resistor 41, thereby creating a high level at the input terminal of the inverter 37.

In the embodiment of FIG. 3, the pin FFC connected directly to the collector of the transistor 30 is not connected to the recorder. This arrangement is suitable for those situations in which the required control signal is compatible with the potential Vp of the transport power. For example, the transport power may be at a level of 5 volts and suitable for providing control signals that are TTL compatible.

However, it is possible that one or more of the control signals is required to be at a higher level, e.g. 12 volts. The collector pin FFC can be used to provide a higher level signal $V_q$, as illustrated in FIG. 4. In such a case, the protection diode 34 enables the transport power pin to be bussed to the collector of the transistor 30 without the voltage level of the transport power being affected by the higher potential $V_q$.

Referring again to FIG. 1, the signal processor 12 has an output line for each of the different control signals that are to be applied to the recorder. Each output line is connected to a switching device comprising an optical isolator and output pin arrangement of the type referred to in connection with the fast-forward control signal. The series resistor 32 connected between the transport power pin and the collector terminal of each of the switching devices prevents a current sink at one collector pin from affecting the level of the signal at the other pins. Preferably, the emitter terminals of the phototransistors are respectively connected to the pins in one row of the connector that includes a ground pin.

With such an arrangement, when all of the control signals require a current sink, the embodiment of FIG. 2 can be easily implemented by laying a bare wire across the ground pin and all of the emitter pins in the connector. This avoids the need for a separate jumper wire for each emitter pin.

Certain types of operations in the recorder may require a voltage input as well as a pull-up, pull-down or pulse signal. For example, during the fast-forward and rewind operations, the speed of the tape is controlled by a voltage signal referred to as a shuttle voltage. The shuttle voltage for the fast-forward mode is determined by a voltage divider comprising a resistor 36 and a manually variable potentiometer 38. The tap of the potentiometer 38 is connected to a negative feedback operational amplifier 40. The output voltage from the amplifier 40 is provided to a gate 42. The fast-forward output signal from the processor 12 is applied to the gate 42 as an enabling signal. Whenever the fast-forward mode of operation is required, the output signal from the operational amplifier is transmitted as the shuttle voltage by means of the gate 42.

In a similar fashion, the rewind tape speed is determined by a voltage divider comprising a resistor 44 and a potentiometer 46 connected to an operational amplifier 48. The output voltage from the operational amplifier 48 is transmitted as the shuttle voltage whenever a gate 50 is enabled by the rewind control signal from the processor 12.

It may also be desirable to use an external capstan reference for the recorder. A reference enable control signal generated by the processor 12 is applied to one of the optical isolators 52 in the interface unit. In addition, it is applied as an enabling signal to a gate that transmits a desired reference signal REF to the connector.

Only one interface unit for providing control signals to one recorder is illustrated in FIG. 1. However, it will be appreciated that the number of interface units within the synchronizer will be equal to the number of recorders being controlled. Each interface unit will have its own personality input section and memory unit. A separate signal processor can be used for each interface unit, or the same processor can be used for two or more units, depending on available capacity.

The present invention can be embodied in other specific forms without departing from the spirit or essential characteristics thereof. The presently disclosed embodiment is therefore considered in all respects to be illustrative and not restrictive. The scope of the invention is indicated by the appended claims rather than the foregoing description, and all changes that come within the meaning and range of equivalency of the claims are therefore intended to be embraced therein.

What is claimed is:

1. A universal interface unit for receiving input signals and generating corresponding output signals in one of a number of different formats in dependence upon the requirements of an external device to which the output signals are to be applied, comprising:
   means for generating a data signal relating to the signal format requirements of an external device;
   a memory unit containing information relating to a plurality of different formats of output signals to be generated and, in response to said data signal, producing output information pertaining to the particular signal format requirements of the external device; and
   processing means for receiving the input signals and generating the corresponding output signals in the format indicated by the output information from said memory unit.

2. The interface unit of claim 1 wherein said processing means includes a switching device having two terminals that are selectively connected to one another when an output signal is generated, one of said terminals being normally biased to a predetermined potential.

3. The interface unit of claim 2 wherein said switching device is a transistor that is rendered conductive when an output signal is generated, and said two terminals comprise the collector and emitter terminals of said transistor, respectively.

4. The interface unit of claim 3 wherein said collector terminal is normally biased to the predetermined potential.

5. The interface unit of claim 3 or 4 wherein said switching device comprises an optical isolator, and said transistor is a phototransistor.

6. The interface unit of claim 2, 3 or 4 further including means for connecting the unbiased terminal of said switching device to the external device when the requirements of the external device call for a current source as the input signal.

7. The interface unit of claim 2, 3, or 4 wherein said unbiased terminal is connected to a reference potential and further including means for connecting said biased terminal to the external device when the requirements of the external device call for a current sink as the input signal.

8. A synchronizer for controlling the operation of any one of a number of different types of tape recorders having different control signal format requirements, comprising:
   means for generating output signals indicating operations to be performed by the recorder;
   means for generating a personality signal that identifies the control signal format requirements of the recorder;
   a memory unit containing information relating to a plurality of different control signal formats and responsive to said personality signal to produce a format signal relating to the control signal format required by the recorder;
   a signal processor for receiving said output signals and generating corresponding switching signals having a format determined by said format signal;
   a switching device having two terminals that are selectively connected to one another in response to said switching signals;
   means for biasing one of said terminals to a predetermined potential; and
   means for connecting one of said terminals to the recorder.

9. The synchronizer of claim 8 wherein said switching device is a transistor that is rendered conductive when an output signal is generated, and said two terminals comprise the collector and emitter terminals of said transistor, respectively.

10. The synchronizer of claim 9 wherein said collector terminal is normally biased to the predetermined potential.

11. The synchronizer of claim 8 or 9 wherein said switching device comprises an optical isolator, and said transistor is a phototransistor.

12. The synchronizer of claim 8 wherein said generating means indicates a plurality of different operations to be performed by the recorder, and further including a switching device for each different operation.

13. The synchronizer of claim 12 further including means for generating a voltage signal having a level that is selectively determined by an output signal indicating that at least one of said plurality of operations is to be performed.

* * * * *